United States Patent [19]

Thomas

[11] Patent Number: 4,890,160
[45] Date of Patent: Dec. 26, 1989

[54] TV PICTURE MOTION VECTOR MEASUREMENT BY CORRELATION OF PICTURES

[75] Inventor: Graham A. Thomas, Tadworth, United Kingdom

[73] Assignee: British Broadcasting Corporation, London, England

[21] Appl. No.: 126,108

[22] PCT Filed: Dec. 23, 1986

[86] PCT No.: PCT/GB87/00796

§ 371 Date: Jan. 19, 1988

§ 102(e) Date: Jan. 19, 1988

[87] PCT Pub. No.: WO87/05769

PCT Pub. Date: Sep. 24, 1987

[30] Foreign Application Priority Data

Mar. 19, 1986 [GB] United Kingdom ............... 8606809
Jul. 16, 1986 [GB] United Kingdom ............... 8617320

[51] Int. Cl.[4] .................... H04N 7/18; H04N 7/12
[52] U.S. Cl. ................................. 358/105; 358/135; 358/136
[58] Field of Search ............... 358/105, 133, 136, 138, 358/93, 135; 364/728

[56] References Cited

U.S. PATENT DOCUMENTS

| 4,460,923 | 7/1984 | Hirano et al. | 358/136 |
| 4,689,672 | 8/1987 | Furukawa et al. | 358/105 |
| 4,689,673 | 8/1987 | Ohki et al. | 358/105 |
| 4,727,422 | 2/1988 | Hinman | 358/105 |
| 4,733,298 | 3/1988 | Koga | 358/105 |

FOREIGN PATENT DOCUMENTS 2050752A 5/1980 United Kingdom .
2172171A 3/1986 United Kingdom .

OTHER PUBLICATIONS

Martin, W. N., and J. K. Aggarwal, "Survey Dynamic Scene Analysis", *Computer Graphics & Image Processing,* vol. 7, No. 3, (1978), pp. 356–374.

Pratt, William K., "Correlation Techniques of Image Registration", *IEEE Transactions on Aerospace and Electronic Systems,* May 1974, pp. 553–558.

Anandan, P. and Richard Weiss, "Introducing a Smoothness Constraint in a Matching Approach of the Computation of Optical Flow Fields", *IEEE* 1985, pp. 186–194.

Pearson, J. J. et al., "Video-Rate Image Correlation Processor", *SPIE, vol. 119, Application of Digitial Image Processing,* (1977), pp. 197–205.

Primary Examiner—John K. Peng
Attorney, Agent, or Firm—Robert F. O'Connell

[57] ABSTRACT

A correlation surface is derived by phase correlating two pictures selectively displaced in the X and Y directions. The illustrative surface shows a large peak at zero displacement, corresponding to a stationary background, and a fairly large peak corresponding to a moving object, the X, Y position of the peak indicating the magnitude (pixels per field period) and direction of the motion vector. A set of motion vectors is thus determined and testing is then carried out, on a pixel by pixel basis or pixel block by pixel block basis, to determine which of the motion vectors gives the best match in deriving the second picture from the first. The motion vector thus assigned may be used in temporal interpolation of the pictures.

27 Claims, 6 Drawing Sheets

TV PICTURE MOTION VECTOR MEASUREMENT BY CORRELATION OF PICTURES

1.0 FIELD OF THE INVENTION

There are many picture processing applications in which knowledge of the speed and direction of movement of all parts of the TV picture would be very useful. These applications include standards converters, noise reducers, bandwidth reduction schemes, and others where any sort of temporal interpolation is required. Even information concerning pans and the movement of the larger objects in the scene would be very useful.

1.1 PRIOR ART

Various techniques have been used to measure motion in TV pictures. The most promising of these appeared to be a method based on phase correlation, which has been shown to be capable of measuring large movements of the complete scene to sub-pixel accuracy. (PEARSON, J. J. HINES, D. C., GOLOSMAN, S., KUGLIN, C. D. 1977 Video-rate Image Correlation Processor. S.P.I.E. Vol. 119. Application of Digital Image Processing (IOCC 1977)).

1.2 THE INVENTION

The object of the present invention is to extend the known technique to measure the motion vectors in a scene containing many objects moving in different directions and speeds.

The invention is defined with particularity in the appended claims. The preferred practice of the invention is explained in section 2 below.

2.0 BASIC PHASE CORRELATION TECHNIQUE

The process of calculating motion vectors for every pixel in the picture is broken down into two stages. The first stage involves correlating two successive pictures (or fields, depending on the exact application) to determine the principal motion vectors present in the scene. The second stage attempts to assign one of these vectors to every pixel. For some pixels it may be impossible to assign a motion vector, for example if the pixel corresponds to a very small object or to uncovered background.

2.1 STAGE ONE—VECTOR MEASUREMENT

In the first stage of the process, 2-dimensional Fast Fourier Transforms (FFTs) of the luminance components of two successive pictures are calculated. Then for each spatial frequency component in the transforms, a unit length vector is calculated whose phase angle is equal to the difference in the phases of this frequency in the two pictures. A reverse FFT is performed on the resulting complex array, which produces an array of real numbers giving the correlation between the two pictures. Mathematically, if $G_1$ and $G_2$ are the discrete 2-dimensional Fourier transforms of the two successive images, then the complex array Z is calculated at every spatial frequency (m,n) using $$z(m,n) = \frac{G_1(m,n)G_2(m,n)^*}{|G_1(m,n)G_2(m,n)^*|}$$

and the phase correlation is given by the inverse Fourier transform of Z, which will only have real components.

The resulting phase correlation array can be thought of as a surface whose height at a particular point (x,y) is proportional to how well the two images correlate when the relative displacement between them is (x,y). In the case of a simple shift between the two pictures, the correlation surface would be a delta function centered on the shift vector. The idea is that there will be a peak in this surfaced for each dominant motion vector in the scene. Measuring these motion vectors involves hunting for large peaks in the surface. The relative heights of the peaks will reflect the relative sizes of the moving objects. The main novel feature of this method is to look for several peaks rather than just one, thereby allowing the detection of many velocities in one operation.

To measure the motion vectors to sub-pixel accuracy it is necessary to perform some interpolation on the correlation surface.

In order to measure as many of the velocities present in a scene as possible, it helps to divide the picture up into blocks, rather than to perform correlations on whole pictures. This is because the number of individual peaks that can be detected accurately is limited by noise to about 3 peaks per block. In addition it is only possible to resolve velocity peaks if they are separated by a shift vector greater than about one pixel per field period. The block size would be large compared with the largest shifts that are expected, as the technique cannot correlate objects that move between blocks. A size of 64 by 64 pixels is convenient. If on the other hand, it is only necessary to measure the few most significant motion vectors, then it may be as well to transform whole pictures, or at least very large blocks. It should be remembered that this division into blocks is only made for the purpose of measuring motion vectors; the vecotrs are still assigned on a pixel-by-pixel basis.

2.2 STAGE TWO—VECTOR ASSIGNMENT

The first stage of the process gives us a set of motion vectors that are present in the scene, but tells us nothing about which parts of the scene are moving with which vector. The second stage involves 'trying out' each possible vector on every pixel, and assigning the vector that gives the best 'fit'. In situations where motion information is required on a block-by-block basis (for example a block based bandwidth compression system), there would be no need to assign a vector to each pixel, and the assignment would be done on a block basis.

For every detected vector, an 'error surface' is formed by calculating the modulus difference between the two input pictures when shifted by the motion vector under consideration. Areas of the two pictures that match well will produce low errors, and it is reasonable to assume that these areas correspond to a moving object with this particular motion vector. It is preferable to perform some sort of spatial filtering on the error surface in order to reduce the effects of noise.

If the motion vectors are being measured to sub-pixel accuracy, it will be necessary to use some sort of spatial interpolator when calculating the error surface.

Once all the motion vectors measured in the first stage have been tried, each pixel is assigned the motion vector which gave the smallest error value. A threshold error level could be set, defining the maximum acceptable error level. Pixels whose errors are above this level with every trial vector could be flagged as 'motion unknown'. Such pixels would probably correspond to areas of erratic motion, covered or uncovered background.

If the motion vectors were measured by transforming the input pictures in blocks rather than as a whole, then it is only worth trying vectors measured in the neighbourhood of the pixel under consideration. The chances are that most pixels could have the correct vector assigned to them merely by considering the vectors measured in the block containing the pixel. Ideally the vectors measured in the immediately surrounded blocks should be tried as well, particularly for pixels near the edge of blocks. This is important in situations where a small part of a moving object intrudes an adjacent block.

2.3 THE ADVANTAGES OF PHASE CORRELATION

There are two basic methods of motion estimation that have been used other than phase correlation, namely spatiotemporal gradient techniques and optimal matching.

Both of these techniques fail for large movements, and although applying them recursively from picture to picture helps, they still fail for rapidly accelerating objects and can take a significant length of time to recover after shot changes. It is often necessary to divide the picture into small blocks and assign motion vectors on a block-by-block basis, which means that the edges of moving objects will often have incorrect velocity vectors assigned to them.

Phase correlation overcomes the problems with these more 'traditional° techniques. For small movements, all three techniques can be shown to be roughly equivalent but, for large movements, phase correlation comes into its own.

The act of performing correlations between large sections of two successive pictures is equivalent to using an optimal matching technique with a very large number of trial vectors. The quickest way to perform such correlations is by calculating the FFTs of both pictures, multiplying them together and untransforming the resulting array. Once this approach has been adopted, it is very little extra effort to perform a phase correlation. This has the advantage of making the technique immune to brightness changes in the scene, and tends to produce sharper peaks in the correlation surface. A phase correlation can be performed with simpler hardware than would be needed for a cross-correlation, since it is possible to quantize the unit amplitude vectors in Z quite coarsely.

This technique has the intrinsic advantage that it detects the dominant motion vectors in a scene. These would usually correspond to large areas of background and large moving objects. These are the sort of things that the human eye can easily follow, and hence they are the most important parts of a scene to process correctly.

3.0 DESCRIPTION OF DRAWINGS AND PREFERRED EMBODIMENTS

The invention has been investigated in detail by means of computer simulation of the phase correlation technique and will be described in more detail with reference to the accompanying drawings, in which:

FIG. 1 shows the correlation surface for a stationary picture using a SIN (x)/x interpolator.

FIG. 2 shows the surface for a pair of 10 pixels per field period again using a SIN (x)/z interpolator.

FIG. 3 shows the surface for a stationary picture using a smoother interpolator.

Figure 2:
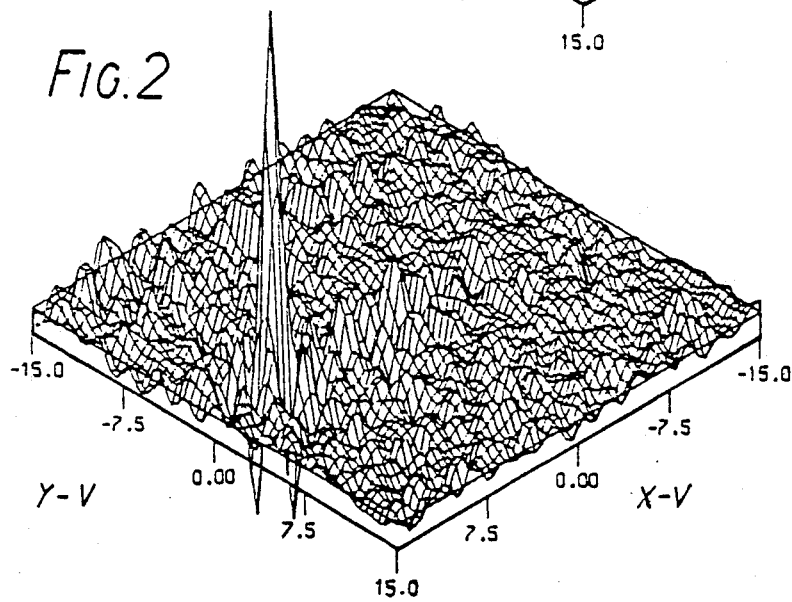
Figure 4:
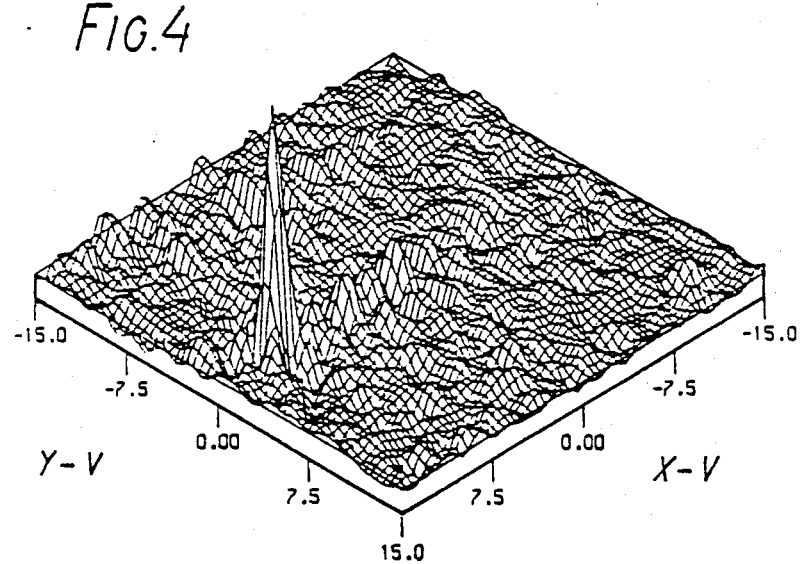

FIG. 4 corresponds to FIG. 2 but using the smoother interpolator.

Figure 5:
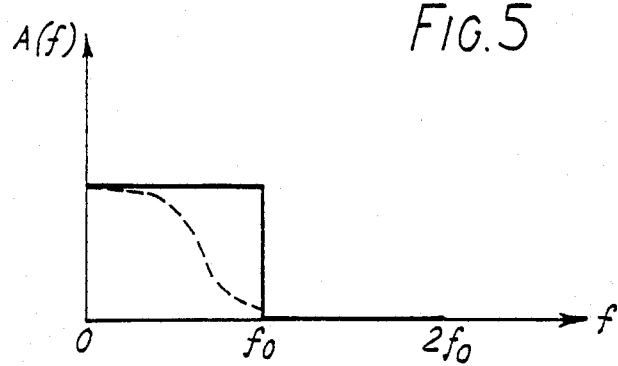

FIG. 5 illustrates windowing of a phase array prior to reverse transformation.

Figure 6:
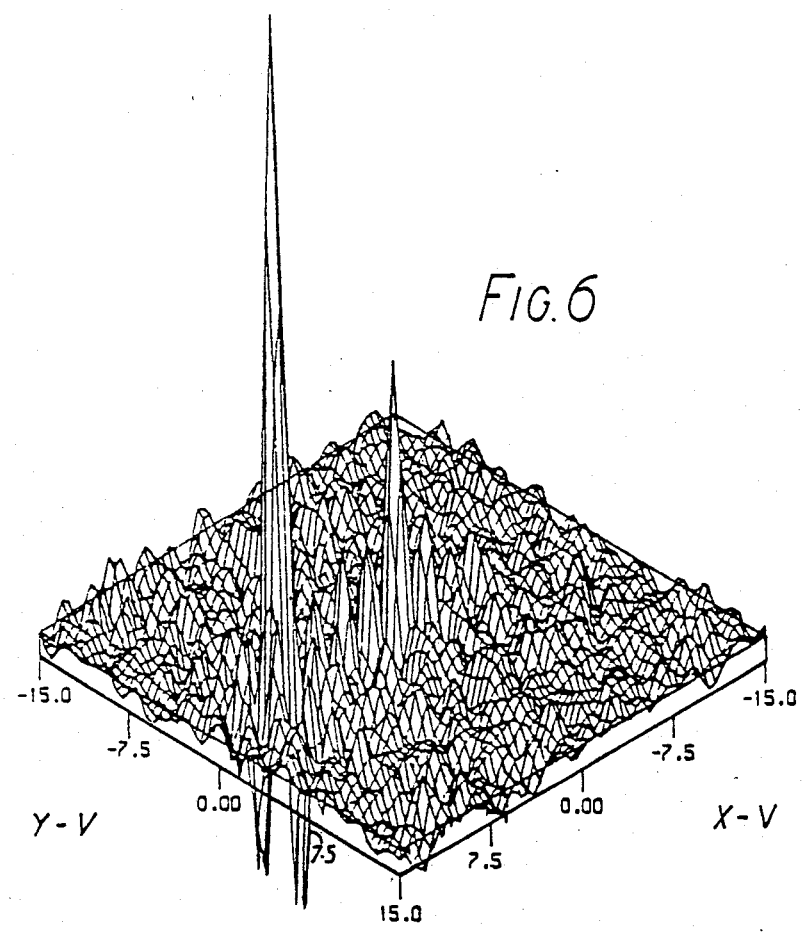

FIG. 6 shows the correlation surface for a pair of 10 pixels per field but with a "guard band" on the input picture.

Figure 7:
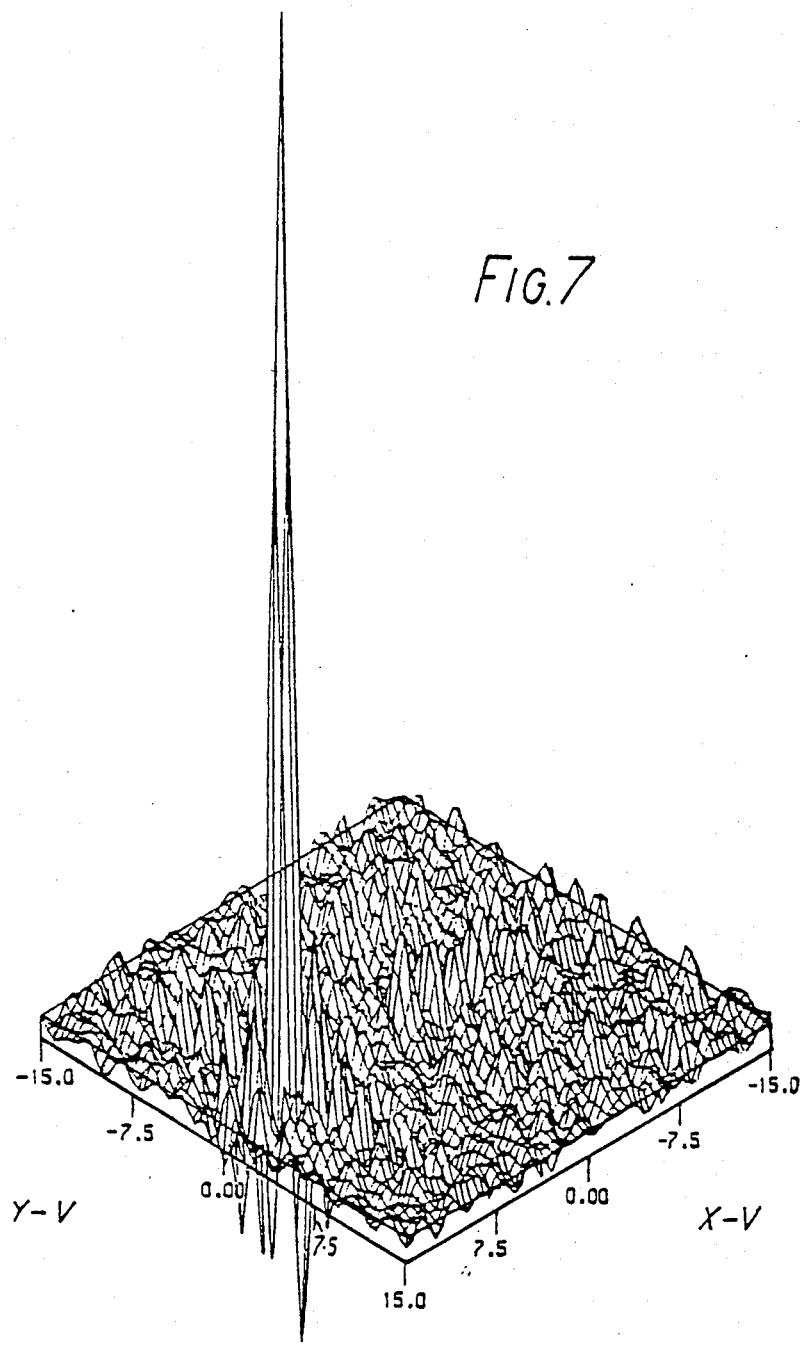

FIG. 7 corresponds to FIG. 6 but further with a raised cosine aperture on the input picture.

Figure 8:
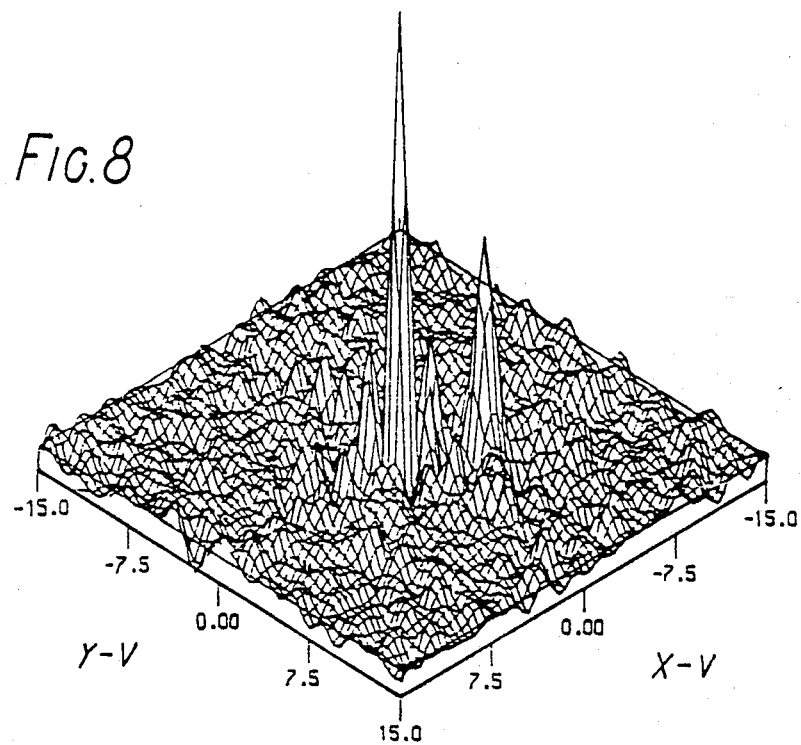

FIG. 8 shows the correlation surface for an object moving over a stationary background.

Figure 9:
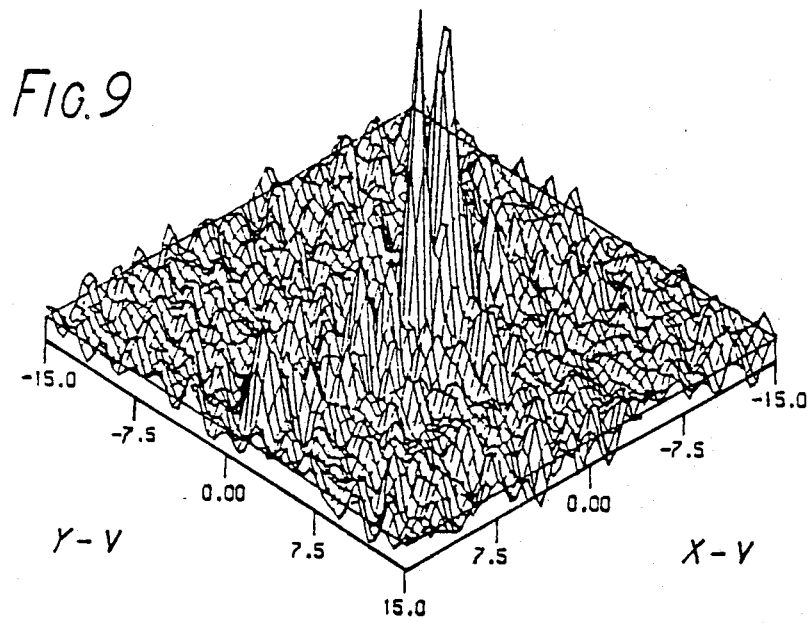

FIG. 9 shows the correlation surface for a moving gate in a "Voit" sequence referred to below.

Figure 10:
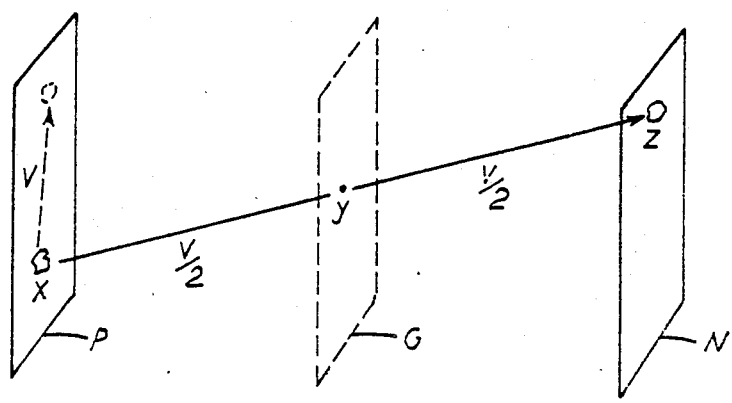

FIG. 10 illustrates how a velocity vector can be assigned in performing a motion compensated interpolation.

Figure 11:
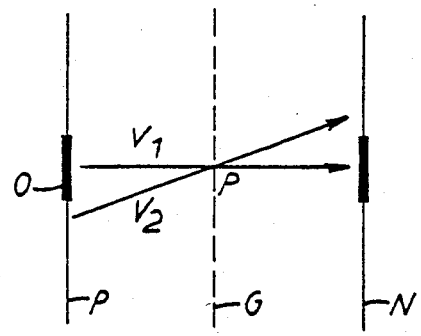

FIG. 11 shows how both a large and a small vector can fit one point.

The purpose of the computer simulations that have so far been performed is to find out how well the phase correlation technique really works. We have not limited the simulations to algorithms that would be easy to implement in hardware; the intention was to find out how good the best algorithm is. The subject of further simulations will be to find out how much the 'ideal' algorithm can be simplified in order to make it suitable for a real time hardware implementation for a given application.

3.1 INVESTIGATION OF VECTOR MEASUREMENT

The first phase of the investigations examined the 'vector measurement' stage of the algorithm. The aim of this phase was to investigate the accuracy of the phase correlation technique, and see how it depended on the relative shift size, number of moving objects and object size, amount of noise, and so on.

3.1.1 MEASUREMENT ACCURACY FOR SIMPLE PANS

Initial investigations dealt with simple pans. Two picture portions were correlated, both taken from the same larger picture but with slightly different locations. Both picture sessions were 64 pixels square, luminance only, and were taken from a portion of the test slide POND which contained a reasonable amount of detail.

Figure 1:
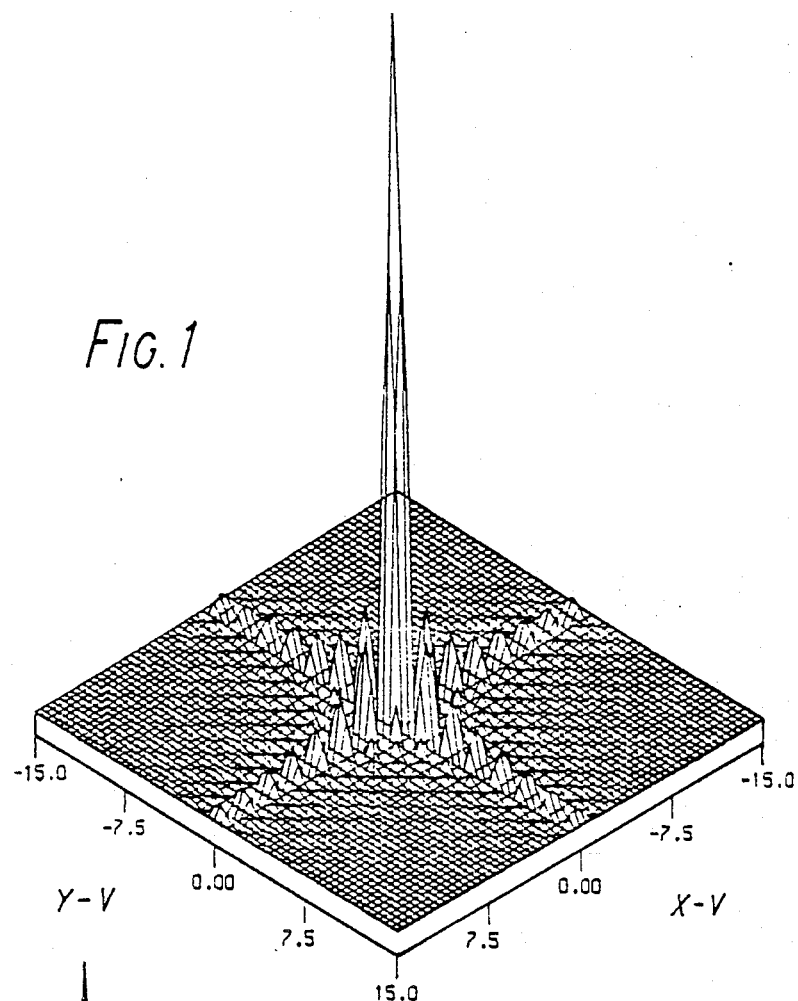
FIGS. 1 to 4 and 6 to 9 show various correlation surfaces, as detailed more fully below. In all these drawings the Z axis shows correlation peaks, while the X and Y axes show X velocity and Y velocity respectively, denoted X-V and Y-V and measured in pixels/field period.

FIG. 1 shows the correlation surface obtained when two identical picture portions were correlated. The phase array Z was padded out with zeroes to form a 128 by 128 array prior to performing the inverse FFT; this enabled values at half-integral shifts to be interpolated with a sin (x)/x impulse response. This is the cause of the 'ringing' visible around the peak. FIG. 2 was produced in the same way but with a horizontal shift of ten pixels between the two picture portions. The location of the peak has moved, and the use of quadratic interpolation (applied independently in the x and y directions) gives the peak location as (9.99,0.02). Hence the shift has been measured to an accuracy of a few hundredths of a pixel in ten pixels. The height of the peak has diminished and noise has been introduced: both effects can be attributed to the revealed and obscured material at the edges of the picture.

Similar experiments were tried with other shift values. The technique was found to be capable of accurately measuring shifts up to the instrumental limit of half the picture size (32 pixels in this case). Shifts any larger than this simply produce peaks at locations corresponding to smaller shifts in the opposite direction (e.g., a shift of +34 pixels appears as −30). Fractional shifts were measured to an accuracy of about 0.02 pixel using the interpolation method described above. Simply using quadratic interpolation without preceding sin (x)x interpolation reduced the measurement accuracy to about 0.1 pixel.

3.1.2 THE EFFECT OF DIFFERENT INTERPOLATION FILTER WINDOWS

The ringing introduced by using the sin (x)/x interpolator produces spurious peaks which can sometimes mask peaks produced by small moving objects. The ringing can be reduced by using a different interpolator. The interpolator can be changed by windowing the phase array $Z(m,n)$ prior to performing the reverse transform. The effects of various windows were investigated. The windows were all of the form $$a + (1-a)\cos(f/f_o \cdot \pi/2) \quad f <= f_o$$
$$0 \quad\quad\quad\quad\quad\quad\quad\quad\quad f > f_o$$

where f is the horizontal or vertical frequency, and $f_o$ is the highest frequency supported in the original array before any zeroes are inserted. FIG. 5 shows the windowing arrangement graphically.

Figure 3:
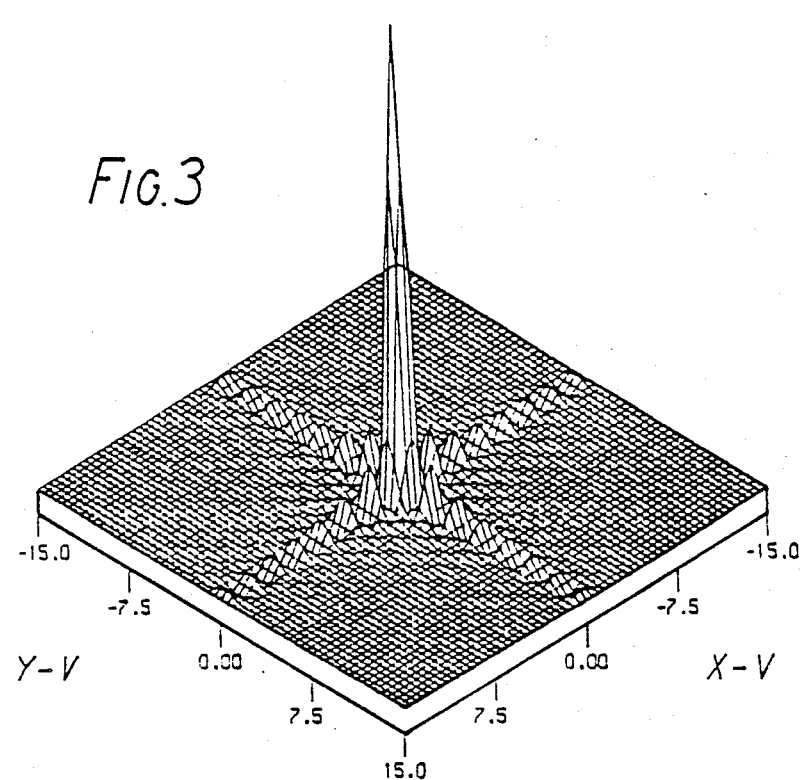

The solid line shows a simple window with frequencies 0 to $f_o$ supported in the array Z and zeroes inserted from $f_o$ to $2f_o$ to enable interpolation of intermediate points. This gives the sin (x)/x impulse response with sharp peaks but "ringing". The broken line shows a Hamming-like window leading to poorly resolved main peaks but smaller subsidiary peaks. This one dimensional windowing function was applied both horizontally and vertically. A value of zero for 'a' gives the rectangular window that produced FIGS. 1 and 2, and a value of 0.54 would give a Hamming window. Experiments showed that a value of about 0.8 gave a reasonable compromise between heights of spurious peaks and sharpness of each peak. FIGS. 3 and 4 correspond to FIGS. 1 and 2 but with an interpolation filter with a=0.8. The filter has the effect of reducing all the peak heights and broadening them slightly, but does not affect the interpolated peak locations.

The number of situations where the spurious peaks cause problems is small, and as the type of interpolator that would be required to remove all the spurious peaks results in unacceptable broadening of the main peaks, then it may not be worth using anything other than a simple rectangular window.

Another way of avoiding the spurious peaks would be to perform the peak hunting operation on the uninterpolated surface. Once a peak had been located, the height of the correlation surface at half-integral shift values could be calculated using an interpolator with a sin (x)/x type of response. This has the further advantage that less points have to be searched to locate maxima. This approach will be the subject of further computer simulations.

It is possible that some improvement in signal-to-noise ratio may be obtained by using 'adaptive windows'. In the basic phase correlation technique, the modulus of all the numbers of the phase array Z is set to unity. This means that the information in frequencies of low amplitude carries more weight than perhaps it should, given that the signal-to-noise ratio of these components will be low. In comparison, no such normalization takes place when performing a cross-correlation, with the result that the correlation peaks are broader and the peak heights become scene-dependent. A compromise between phase correlation and cross-correlation may give better results than using either extreme. This entails normalizing higher amplitude components and reducing the amplitude of low ones. These ideas will be investigated in the next stage of the simulation work.

3.1.3 THE EFFECT OF DIFFERENT INPUT PICTURE WINDOWS

It has been suggested that some sort of padding with zeroes or windowing ought to be performed on the input pictures before they are transformed. The reasoning behind this is that we would introduce unwanted noise by trying to correlate (say) the left and right hand edges when calculating the correlation for a shift with a horizontal component.

Experiments conducted using a guard band of zeroes (but no other windowing) showed that although a small reduction in noise could be produced, a spurious peak at zero velocity is formed. FIG. 6 shows the same correlation as FIG. 2 but with the input pictures padded with zeroes to form pictures that were 128 pixels square. The spurious peak can be clearly seen, and is probably due to the sharp edge between the picture portion and the zero 'guard band' correlating in the two pictures.

The effect of applying a raised-cosine window (of the form used on the phase array Z) to the input picture portions was also investigated. When applied in conjunction with a 'guard band', the spurious peak at zero velocity was removed (confirming the idea that it was caused by the sharp join between picture and guard band). A further improvement in signal-to-noise ratio was obtained. FIG. 7 shows the correlation surface for the same picture portions as FIG. 2, but with a guard band 64 pixels wide and a raised-cosine aperture on the picture portions. The signal-to-noise ratio has further improved, and the spurious peak at zero velocity has disappeared. The computational penalty for this approach is that the transform deals with smaller areas of the picture.

These investigations showed that an improvement in signal-to-noise ratio can be obtained by windowing the input picture with a raised-cosine aperture and surrounding with zeroes. However this represents a significant increase in the processing power required, and the improvement is signal-to-noise ratio is quite small (less than a factor of two). Padding the input picture with zeroes without performing any other windowing is detrimental, as a spurious peak is introduced. Use of a raised-cosine window without padding with zeroes reduces the noise slightly, but would mean that overlapping blocks would have to be used in order to detect motion throughout the picture. Hence in many applications it is probably not worth bothering with any sort of windowing.

3.1.4 THE EFFECT OF NOISE

The way in which noise on the input pictures affects the results of a phase correlation was investigated. Noisy pictures were generated by adding random values (with a given peak value) to the luminance level at each pixel. A correlation was performed between two pictures shifted by ten pixels (as used to generate FIG. 2), with different levels of noise. It was found that adding noise with a peak value 20 dB below peak white level reduced the height of the correlation peak by a factor of 2.4, without significantly changing the general level of noise on the surface. The measurement error increased to about 0.08 pixel. Increasing the amount of noise to 10 dB below peak white level caused a further reduction of a factor 2.2, but the peak was still detectable. The measurement error rose to about 0.3 pixel. This suggests that noisy pictures do not present a significant problem to this part of the motion measurement process. It is possible that the noise immunity could be increased by some 'adaptive windowing' technique on the phase array, as discussed in section 3.1.2.

A possible way of reducing the noise on the correlation surface would be to perform some kind of temporal filtering operation. For example, a first order recursive temporal filter applied to the correlation surface of each block would enhance stationary or slowly changing peaks, while reducing the level of any noise peaks. The disadvantage of this method is that velocity peaks caused by rapidly accelerating objects would be attenuated. It should be possible to choose a filter which gives good attenuation of noise without unduly attenuating genuine moving peaks. It would be advantageous to detect shot changes and inhibit the temporal filtering action immediately after a change.

3.1.5 SCENES WITH MORE THAN ONE MOTION VECTOR

Once the technique had been shown to work well for pans, pictures with an object moving over a background were investigated. The aim of these investigations was to see if the technique could detect accurately several moving objects by producing several peaks.

A portion of a picture ('Dick and Jean') 64 pixels square was extracted, and a 32 by 32 pixel portion from another picture (the blackboard cross from 'Testcard F') was inserted into the middle of this picture. The edges of the inserted pictures were 'blended' with the background picture over a distance of 3 pixels so as not to produce any artificially high frequencies in the resulting picture. A second similar picture was formed, but with the inserted picture portion shifted three pixels to the left and three down.

FIG. 8 shows the resulting correlation surface. The interpolated peak locations (calculated by fitting a quadratic to the sin (x)/x interpolated data as before) were accurate to 0.01 pixel. The relative heights of the peaks reflect the relative areas of moving objects and background, although the ratio of the heights is less than the ratio of the object areas (1.6 compared to 4). The noise around the peaks is due to the uncovered and revealed background around the inserted picture portion.

As the phase correlation technique had no problems accurately measuring this motion, some more severe experiments were tried. The aim of these was to see how small a moving object can be, and still be detected. A picture portion of various sizes was 'moved' with a shift vector of (5,5) over a background picture, which was 64 pixels square. The object's motion vector was accurately detected for objects as small as two pixels square, which was quite surprising, especially considering that the object had moved more than twice its own length.

Investigations with two objects moving over a stationary background showed that 3 peaks (1 for the background and the 2 for the objects) could usually be detected. In some cases though, the velocity peaks were becoming obscured by noise (possibly due to uncovered background) and spurious peaks from the sin (x)/x interpolator. The amount of noise could probably be reduced by the use of windows on the input picture portions and some form of adaptive windowing on the phrase array, as discussed earlier. The spurious peaks from the interpolator may not present a problem if the peak hunting process is carried out on the uninterpolated array. These points will be the subject of further investigations.

As a final test, the correlation surface for two successive fields from a real sequence was generated. A portion of the 'VOIT' sequence that showed the gate moving fairly rapidly over a roughly stationary background was chosen. FIG. 9 shows the correlation surface obtained. The two large peaks correspond to velocities of (0.03,-0.42) and (2.38-0.25). Measurements (using a ruler!) suggested that the speed of the gate was about 2.40 pixels per field period, which agrees very well with one of the values obtained by correlation. Since the correlation was between two successive fields, a vertical shift of half a pixel would be expected, which agrees reasonably well with the vertical shifts detected. The heights of the two large peaks are roughly the same, reflecting the fact that the gate and the background occupy areas of roughly the same size.

3.1.6 SUMMARY OF MOTION VECTOR DETECTION INVESTIGATIONS

The experiments described above showed that the phase correlation technique does indeed work as well as claimed in the reference cited above. For pans and one moving object typical vector measurement accuracies of 0.02 pixel can be obtained by first interpolating the correlation surface by a factor of two in both directions (using an interpolator with an impulse response roughly of the form sin (x)/x), then fitting a quadratic to the interpolated points either side of the maximum (for x and y separately). An accuracy of about 0.2 pixel can be obtained by simply fitting a quadratic to the uninterpolated correlation surface. The accuracy of the technique was largely unaffected by noise, and it was possible to detect very small objects.

In order to be able to measure the velocities of more than 2 or 3 objects in the picture area being correlated, it may be advantageous to make some modifications to the basic technique. One possible modification would be to window the input picture portion with a raised-cosine function and possibly pad it with zeroes, which can reduce the correlation surface noise. It may also be possible to reduce the noise by applying a sort of adaptive window to the phase array, in such a way that small amplitude components carry less weight. The problems experienced with spurious peaks produced by the interpolation process could probably be avoided by carrying out the peak hunting process on the uninterpolated array. Further simulation work is required to determine which of these improvement are worth incorporating for particular applications.

3.2 INVESTIGATION OF VECTOR ASSIGNMENT

The aim of this part of the investigation was to simulate the second stage of the motion measurement process, namely assigning the principal motion vectors to particular pixels. The first problem that had to be dealt with was to find a way of showing how well the vector measurement and assignment had been carried out. It was decided to do this by using the motion vectors to interpolate temporally a picture between the two input pictures. This is not only a stringent test of the method, but also shows what sort of results could be obtained if the technique is used to improve the motion portrayal of film, by 'making up' intermediate pictures.

A computer program was developed that could generate the odd fields of a sequence by temporal interpolation between the even fields (or vice versa). The program allowed the user to change various parameters associated with the method, such as the size of the input picture, the size of the blocks on which correlations were performed, the number of vectors extracted per block, and so on.

3.2.1 DETAILS OF THE METHOD USED

All these investigations were done using the 'basic' phase correlation technique (as described in section 2), with simple square windows on the picture portions and on the array Z. The correlation surface was interpolated by padding with zeroes, as discussed earlier.

In order to see the technique working at its best, the correlations were carried out on blocks (64 pixels by 32 lines) rather than on the whole picture, to measure as many motion vectors as possible. A maximum of 3 vectors was measured per block. The menu of trial vectors for a given pixel consisted of vectors measured in the block containing the pixel, as well as the immediately adjacent blocks. Thus for a pixel in a block in the middle of the picture, a maximum of 27 vectors would be tried.

In order to assign a motion vector to a pixel, an 'error surface' was calculated for each vector, as described in section 2.2. Initial work used a very simple algorithm to interpolate the input pictures so that non-interger vector lengths could be dealt with. This algorithm simply involved taking a weighted sum of the values of the four nearest pixels. The weights were chosen such that when the point being interpolated coincided with the location of either of the four pixels, the interpolated value was equal to the value of that pixel. Later investigations improved on this algorithm by using a two dimensional cubic spline fit. HOU, H. S., ANDREWS, H. C. 1978. Cubic splines for Image Interpolation and Digital Filtering. IEEE Trans. ASSP, Vol ASSP-26, No 6 Dec 78.

The 'error Surface' for each trial vector was filtered with a simple spatial filter with an aperture of the form $$1/(dx + dy + 1) \quad dx, dy <= 2$$
$$0 \quad dx, dy > 2$$

where dx and dy are the absolute horizontal and vertical distances (in pixels) from the point in the error array under consideration. This type of filter was used largely because it is easy to implement, and could be refined. A different form of filtering, such as median filtering, may prove to give better results.

A motion vector was assigned to every pixel; there was no upper limit set for the acceptable error. In an ideal implementation, pixels with large errors would be investigated further, and some account of uncovered background would be made.

The luminance value of each pixel in the output picture was calculated by averaging the values in the adjacent two fields, at locations displaced by the motion vector for the pixel. FIG. 10 illustrates this idea.

FIG. 10 shows a previous filed P, a next field N and the field G being generated. The luminance value at the point in field G is the average of the values at points x and z in fields P and N where the points x and z are displaced from y by $\pm V/2$ and V is the velocity vector assigned at point y. This vector will have been chosen to minimise the luminance difference between points x and z (after spatial filtering).

3.2.2 RESULTS

Using the method outlined above, the even fields from the 'VOIT' sequence were generated from the odd fields by performing a motion compensated interpolation.

Initial investigations performed without any spatial filtering on the error surface showed that incorrect vectors were often assigned to pixels due to noise. The use of the spatial filter discussed above cured this problem. The penalty for using a spatial filter is that the background immediately surrounding a moving object occasionally gets 'pulled along' with the object. This problem can probably be cured by changing the filter type. In the case of revealed or obscured background there is a fundamental problem: since the picture information only exists in one of the two input pictures, no motion vector can be assigned to it. This problem requires a difference approach, and is discussed briefly later.

Once spatial filtering of the error surface was included, the interpolated pictures started to look quite presentable, and only one main problem remained. Most parts of the interpolated picture appeared to be correct, except for the occasional disappearance of lower parts of the car's radiator and sections of the moving gate 'posts'. This problem was found to be due to large motion vectors being applied to slowly moving areas in cases where both large and small vectors would be valid. FIG. 11 illustrates this problem in the case of the car's radiator. This represents a stationary object O against a stationary uniform background. Both $V_1$ and $V_2$ are possible motion vectors for the point P in the field G if the background is uniform. For example the object O might be a silver surround at the bottom of a car radiator against a background provided by the radiator itself and the black area below it in the "Voit" sequence. The picture here referred to is shown in FIG. 3 of BBC Research Department Report 1986/5 published July 1986. The reasoning behind the gate's disappearance is slightly more subtle. The gate is a periodic structure which moves about 4.7 pixels horizontally in a picture period, and repeats itself spatially about every 14 pixels. This means that there are two valid motion vectors for the gate, namely +4.7 and −9.4 pixels per picture period (disregarding the effect of the edge of the gate). If the incorrect motion vector is chosen, the gate 'breaks up' in the interpolated picture.

This problem was alleviated by multiplying the error surface for each vector by a function that increased with increasing vector length. This means that when two vectors give roughly the same match error, the short of the two vectors will be assigned. The weighting function used was of the form $$\left(\frac{v}{v_o}\right)^3 * 10 + 1$$

where v is the length of the motion vector and $v_o$ is the velocity at which the weighting function becomes 10. This function was arrived at in a very arbitrary manner. A value for $v_o$ of 5 pixels per picture period was enough to persuade the program that the gate was in fact moving to the right and not to the left. Investigations with other picture sequences need to be carried out to see how generally applicable this 'fiddle factor' is.

Once this feature had been incorporated, very presentable output pictures were produced. The output pictures were slightly soft, partially due to insufficient vertical detail being available in the input pictures (as only odd fields were used) and partly due to the simplistic spatial interpolator used when applying motion vectors with non-integer components. The spatial interpolator was upgraded to one based on fitting a cubic spline, resulting in sharper output pictures at the expense of a significant increase in the processing time required.

On examining a field from the VOIT sequence that was interpolated using the fully refined method, it is found that it looked surprisingly good, especially considering the lack of an 'undercovered background' algorithm.

The only remaining problems (apart from undercovered background) are that the motion vector of parts of the gate are sometimes assigned incorrectly (despite the fiddle factor described earlier), and the spatial filter on the error surface can cause the edges of objects (or adjacent background) to appear slightly corrupted. Further minor refinements to the algorithm should be able to cure these problems.

Areas of uncovered background could be detected by examining the arrangement of motion vectors in the picture. There must be some obscured or revealed background at the boundary between regions with different vector components normal to the boundary. In order to work out what picture information belongs in such areas in an interpolated picture, more than two input pictures need to be examined.

Although these investigations involved dividing the input picture up into many blocks to perform the correlation, this may not be necessary for many applications. A part of the VOIT sequence was interpolated by transforming the picture as one big block rather than 16 small ones, and extracting the four principal vectors from the correlation surface. The interpolated pictures were almost indistinguishable from those obtained using many blocks. However, this sequence is a rather special case, since it only shows three principal objects (the gate, the car and the background), and none of these are moving very fast. A sequence containing many fast moving objects or rotating objects would probably look much better if more blocks and hence vectors were used.

3.2.3 SUMMARY OF MOTION VECTOR ASSIGNMENT INVESTIGATIONS

The experiments described above showed that it was possible to correctly assign motion vectors to pixels using the method described in section 2.2. The only modification that was necessary was the incorporation of a weighting factor to bias the vector assignment towards small vectors.

There are several refinements that could be incorporated in the vector assignment algorithm, including improved filtering on the error surface (maybe a different sort of spatial filter, or even a temporal filter). There is also some scope for 'fine tuning' some parameters. In addition, the improvements suggested in section 3.1.6 for the vector measurement algorithm could be incorporated and these may improve the performance of the technique as a whole. These improvements would be particularly important if the motion vectors are measured by transforming the picture as one large block rather than as many smaller blocks. Another useful experiment would be to try to incorporate an 'uncovered background' algorithm.

4.0 HARDWARE IMPLEMENTATION

The details of a hardware implementation of the technique described above would depend heavily on the application that the motion information was to be used in. However, there are some general points that would be applicable to most implementations, and some of these are discussed below. In the following discussions, a sampling rate of 13.5M Hz is assumed.

4.1 VECTOR MEASUREMENT HARDWARE

The vector measurement part of the hardware would be based around a circuit that could perform one dimensional FFTs on an array of data. Such a circuit could be built using some multipliers (or PROMs) and adders to implement one FFT 'butterfly' operation. The data being transformed would be held in RAMs, and a PROM would generate the appropriate sequence of adresses to operate the butterfly between appropriate RAM addresses. Another PROM would hold the 'twiddle factors'. By using a pipelined design, such a circuit would take $n.(\log_2 n)$ clock pulses to do an n point complex FFT. Such a circuit would consist of 8 multipliers, 6 adders, a selection of PROMs holding twiddle factors, and 4 RAMs, each holding a copy of the array being transformed. The physical size of such a circuit would depend on the number of bits required in the calculation (which has yet to be determined), but it would probably fit on 1 or 2 4U boards.

A controlling board could hold the picture portion (or the whole picture) being transformed, and pass it (one line or column at a time) to the FFT board. If the picture being transformed was n pixel square, 2n FFTs are necessary, giving a total of $2n^2 \log_2 n$ clock periods per 2-D FFT.

Since such an arrangement could perform complex FFTs, it would be possible to arrange the data so that two real arrays could be transformed in one operation. In order to calculate the correlation surface for one block, 2 2-D FFTs are required, giving the total number of clock periods as $2n^2 \log_2 n$ for the FFTs.

Consider a simple case where we want to measure velocities on a picture-by-picture basis. If the picture was transformed as one block of 512 elements square, the transform could be performed in about 0.35 seconds with one FFT block. The required transform rate would be 40 mS per picture at a 50 Hz field rate, so that about 10 such 'FFT engines' would be needed. This totals about 80 multipliers and 60 adders. Although this represents a large amount of hardware, it is quite feasible. Additional hardware would be needed to multiply the phase arrays between the transforms, but this would only represent about 1/9th of the hardware required for the FFT.

Further hardware will be needed to perform the peak hunting and interpolation process. Such hardware would probably be similar in size to a digital filter with an aperture of 3 pixels square (as 9 points have to be examined to determine if a point is a maximum), but would be based around comparators rather than multipliers. Thus this would not require a significant amount of hardware.

4.2 VECTOR ASSIGNMENT HARDWARE

The complexity of this part of the equipment would again depend very much on the specific application. For something like a standards converter, a motion vector of sub-pixel accuracy would be required for each pixel, whereas in a bandwidth reduction system, it may only be necessary to assign vectors to pixels on a block-by-block basis, and sub-pixel accuracy may not be important. The number of trial vectors per block would also directly affect the size of the hardware.

Consider the worst case where a vector of sub-pixel accuracy is needed for each pixel. Hardware resembling two spatial interpolators, a subtractor, and a spatial filter would be required for each trial vector. This might represent something of the order of 20 to 30 multipliers with associated adders. If we were trying 4 vectors per pixel, a total of about 100 multipliers may be required.

On the other hand, a block based vector assignment system in which sub-pixel accuracy was not important would be a lot simpler. The hardware required could reduce to as little as a few subtractors and adders per vector.

If the transforms were carried out in smaller blocks, costs might be reduced slightly, but the vector assignment hardware may become more complicated. If motion vectors are not required to sub-pixel accuracy, it may be possible to get away with filtering the input picture by a factor of two in both directions prior to performing the FFTs, and this could reduce the cost of the hardware by a factor of 4.

5.0 USING ONE DIMENSIONAL TRANSFORMS

The first stage of the motion vector measurement technique as described involves performing a two-dimensional phase correlation between two successive images in a sequency. For a picture portion that contains m×n elements, this involves carrying out m Fourier Transforms of length n followed by n Fourier Transforms of length m, calculating the phase difference for each of the (m×n) spatial frequencies, and performing the same number of reverse transforms. The resulting phase correlation surface is then interrogated to find the location of the dominant peaks.

Most of this calculation can be avoided by carrying out a pair of orthogonal one dimensional transforms on the picture data after applying a one dimensional filter to the picture, and hence measuring the components of the dominant shifts parallel to given axes. This could be described as a 'variables separable' approach. For example, the picture could first be vertically filtered by summing all elements in each column of pixels. A phase correlation would then be performed between the resulting row of values and the row of values that resulted from filtering the previous picture. The dominant peaks in the correlation function would give the horizontal components of the dominant motion vectors in the picture. A similar process would be performed to measure the vertical components of the dominant shifts.

This approach results in significantly fewer transforms being needed. For a picture portion of n by n samples, the two dimensional approach requires a total of 4n transforms, whereas the variables separable approach requires 4. The disadvantage of this approach is that the peaks in the correlation function may be more subject to noise and more difficult to pick out.

As it stands, this method cannot uniquely identify the locations of the dominant peaks, since there is no indication as to which horizontal and vertical components should be paired up. This is only a problem when more than one dominant vector is of interest. It can be shown that the location of n peaks can be uniquely identified by calculating at least n+1 correlations on mutually non-parallel axes. As n rises, however, the probability of there being more than n possible peak locations diminishes even if there are n or less axes. In a practical case where we want to find, say, 4 peaks, 4 correlations would probably be adequate. The probability of assigning incorrect peak locations also decreases with the accuracy of the coordinate measurement. Even if some uncertainty in peak location remains, this can always be overcome by increasing the numbers of shift vectors that are tried in the vector assignment stage.

To summarize, the amount of calculation required to find the dominant peaks in the correlation surface for two pictures can be significantly reduced by performing a number of one dimensional correlations on the filter picture. The filtering operation amounts to summing the picture elements along lines perpendicular to the axis of the correlation. The correlations must be performed on mutually non-parallel axes. To uniquely identify the locations of n peaks using this technique, it is necessary to carry out at least n+1 correlations, although for n>3, fewer correlations will usually suffice. If 4 correlations were performed on a picture portion d pixels square, the number of Fourier Transforms required per input picture would be 8, compared to 4d for the full two dimensional method. For a typical block size, this amounts to savings in hardware of the order of a factor of 30. The penalty paid is that the peaks will probably be broader and noisier, and some false peak locations may be produced.

6.0 APPLICATIONS

This description has explained a novel technique for applying phase correlation to measure motion in television pictures. Computer simulations have shown that the technique appears to work very well (probably better than any other published technique). Various refinements to the technique have been suggested.

The invention will be seen to lie in the combination of correlation of two pictures to determine correlation as a function of selective displacement (in the general case in two dimensions), thereby to determine a plurality of peak correlation values corresponding to respective motion vectors, followed by testing on a pixel-by-pixel or block-by-block basis which of these motion vectors gives the best fit in deriving one of the pictures from the other.

The technique appears to offer great hope that the quality of equipment such as standards converters could be dramatically improved. In addition, it opens the door to new applications such as the improvement of the motion portrayal of film.

An advantageous application for this technique is to improve the quality of a motion adaptive bandwidth compression system. This involves measuring the principal motion vectors in a scene, and assigning them on a block-by-block basis (a block being about 6 pixels square).

The motion vector measurement technique can be usefully applied in any situation where it is necessary to perform temporal interpolation on a series of images or follow the movements of objects in a scene. The following paragraphs describe some applications in more detail.

6.1 IMPROVEMENT OF FILM MOTION PORTRAYAL

When a film is shown on television, each frame is displayed twice (once scanned as an odd television field and once as an even field in an interlaced system). Such an arrangement enables a film shot at 25 (or 24) frames a second to be seen at (nearly) the correct speed. While the process of repeating pictures on successive fields significantly reduces the level of flicker that would be experienced if each picture was only shown once, the process also introduces motion impairments. As the observer's eye tracks moving objects, a double image appears on the retina because each moving object is not shown at the correct place at the right time.

The motion impairments introduced by this system could be virtually eliminated if intermediate pictures in the film sequence were generated using motion compensated interpolation.

Each pixel in the intermediate picture could be generated by averaging the luminance levels at the corresponding pixels in the following and preceding pictures, displaced by plus and minus half the appropriate motion vector respectively. For colour film, the values of the R, G and B components would each be derived in this way.

Areas of uncovered or obscured background could not be dealt with in this way since such areas would not have a proper motion vector. In order to deal with these areas, it is first necessary to determine if the area corresponds to uncovered or obscured background. This can be determined by examining the component of motion vectors in the surrounding areas normal to the boundary. Areas of uncovered background will have neighbouring vectors pointing away from them, and obscured background areas will have neighbouring vectors pointing towards them. Picture information in uncovered areas must be taken from the following picture, and information in obscured areas must come from the preceding picture. In order to determine the location of the required picture information in the following or preceding picture, it is necessary to examine the motion vectors measured between the following two pictures or the preceding two pictures. The required area will be that one which would originate from or end up at the unassigned area when its motion is extrapolated backwards or forwards in time.

These principles can be applied equally well to other field or film rates. For example, when showing film on a 60 Hz television system, two intermediate frames would be generated between each pair of film frames. New pictures would be generated 2/5 and 4/5 of the way between one pair of frames, and 1/5 and 3/5 of the way between the next pair, and so on. The generation of an intermediate picture at a time other than halfway between two frames involves exactly the same process as outlined above except that vector assignment is performed at the appropriate time between the pictures rather than midway. The amplitude of the luminance (or colour component) signal for each pixel in the picture being generated would be a weighted average of the value at the appropriate points in the adjacent pictures, such that a proportionally higher weighting is given to the value in the nearest picture.

6.2 HIGH QUALITY STANDARDS CONVERSION

Whenever it is necessary to convert pictures from one field rate to another, temporal interpolation is required. Knowledge of the motion vectors of the scene enables this process to be carried out with far fewer impairments that are introduced using conventional techniques.

In order to perform motion compensated standards conversion it is first necessary to decode the signal into luminance and chrominance components if it was in a coded form, and convert the incoming interlaced pictures to a sequentially scanned standard. This latter process in itself can benefit from the knowledge of the scene's motion vectors, since one field can be displaced by the appropriate motion vector with respect to the other before interpolating the missing lines. Alternatively a vertical-temporal filter can be used, although this will result in some loss of vertical detail in moving areas.

Once the input pictures have been converted to sequential form, motion compensated temporal interpolation is used to generate pictures at the times required by the output field rate. This process is identical to that described above for improving the motion portrayal of film, except that it is only necessary to generate every other line of the output pictures, assuming conversion to an interlaced standard.

6.3 GENERATING OF SMOOTH SLOW MOTION SEQUENCES

It is often necessary to replay a short sequence of television pictures in slow motion. Conventionally this is done by repeating each field several times (or repeating a field followed by a field generated using a simple interpolation process). This results in jerky motion. It is possible to use a special camera with a very high field rate to achieve smooth slow motion, although this can introduce operational difficulties.

Smooth slow motion could be achieved using conventional cameras if extra field could be generated using temporal interpolation. This can be done using the process described earlier for performing standards conversion. The number of intermediate fields that need to be generated would depend on the amount by which the motion was to be slowed down.

The electronics required to generate the intermediate fields would be placed on the output of a conventional video tape recorder with simple slow motion playback facilities. The equipment would measure the number of times each field was repeated and generate the appropriate number of intervening fields to replace the repeated fields.

In order to obtain sharp pictures it would be necessary to use a camera with a short integration time. This does not present any significant operational problem;

indeed future cameras may all tend to have short integration times.

6.4 VIDEO NOISE REDUCTION

In order to reduce noise on television pictures, it is necessary to apply a filter to the signal. Spatial filtering results in loss of detail in the picture which is usually unacceptable. Temporal filtering can be very effective, although straightforward temporal filtering introduces serious impairments in moving areas of the picture, so such filtering has to be disabled in these areas. This results in the appearance of noise in and around moving objects.

Motion vector measurement techniques can be incorporated in the temporal filtering process so that it may be extended into moving areas. In the case of first order recursive temporal filtering, this would entail shifting each pixel (or group of pixels) in the frame store by the corresponding motion vector prior to performing each recursion. If the filtering was performed using a transversal filter, the readout address of each store would be displaced according to the sum of the local motion vectors over the number of fields between the output filed and the stored field.

6.5 BANDWIDTH REDUCTION

Motion vector measurement can be used to great advantage in almost all video bandwidth reduction techniques since knowledge of localized motion vectors is the key to being able to exploit the temporal redundancy in the signal. An adaptive subsampling system could use knowledge of motion vectors to enable missing samples to be reconstructed from preceding fields. DPCM systems can use motion vectors as the basis of the predictive element. In both these systems, information on the motion vectors would be derived at the transmitter by performing the measurement between two successive fields, and could be transmitted to the receiver along with the rest of the signal.

6.6 ADDING COLOUR TO BLACK AND WHITE FILMS

Recently a process known as 'Colorization' has been developed (by Colorization Inc.) whereby colour versions of black and white films can be produced. A still frame from the film (stored in a computer) is 'coloured in' by an artist. The computer then attempts to colour in the following frames by working out which areas are stationary, and colouring these areas with the colour previously specified for this area. Moving areas are not dealt with and require the intervention of the artist.

If motion vectors were assigned to each point in a frame to be coloured in (by correlation with the previous frame), and each point assigned the colour of the point in the previous frame pointed to by the vector, then the technique could be extended to moving areas. The only areas that would require the intervention of the artist would be areas of uncovered background and areas of complicated motion which could not be tracked. (There would be no problem with obscured background because the vectors are assigned directly to the second of the two pictures, so no areas could ever be flagged as 'obscured'.) Addition of motion vector measurement to this process would thus greatly decrease the amount of work the artist has to do and so significantly speed up the colouring process.

6.7 INCREASING FIELD RATE

Interpolation may be used to increase the field rate for display purposes.

I claim:

1. A machine method of TV picture motion measurement, comprising a first step of correlating first and second pictures to determine correlation as a function of selective displacement, thereby to determine a plurality of peak correlation values corresponding to respective motion vectors, and a second step of testing for each of a plurality of elementary areas of the pictures which of these motion vectors gives the best fit in deriving one of the pictures from the other, and wherein said second step comprises the following operations:
   (a) an elementary area of a picture is derived from said first picture using each of said motion vectors determined in said first step, thereby to form a set of derived elementary areas corresponding to said motion vectors respectively;
   (b) each derived elementary area is compared with the corresponding elementary error as a sum over the elementary areas of the magnitudes of the differences between corresponding points of said elementary areas;
   (c) that one of said motion vectors which results in the smallest comparison error is selected as giving the best fit in deriving said elementary area of said second picture from said elementary area of said first picture;
   (d) repeating operations (a), (b) and (c) for each of said plurality of elementary areas.

2. A method according to claim 1, wherein the selective displacement is in two dimensions and two-dimensional correlation is performed.

3. A method according to claim 1, wherein a plurality of one-dimensional correlations are employed using one-dimensional displacements in different directions.

4. A method according to claim 3, wherein the number of one-dimensional correlations is greater than 2 and a plurality of motion vectors are determined as those vectors which have components in the said different directions matching the peak correlation values provided by the one-dimensional correlations.

5. A method according to claim 1, wherein the motion vectors are measured to sub-pixel accuracy by interpolating the correlation function.

6. A method according to claim 1, wherein the step of correlating is performed separately in respect of a plurality of blocks of pixels and the whole assembly of motion vectors thereby determined is used in the second step.

7. A method according to claim 1, wherein the step of correlating is performed separately in respect of a plurality of blocks of pixels and, in the second step, only the motion vectors determined in relation to a given block are used in the testing in relation to that block.

8. A method according to claim 1, wherein the step of correlating is performed separately in respect of a plurality of blocks of pixels and, in that the second step, in the testing in relation to a given block, the motion vectors used are those determined in relation to that block and a plurality of adjacent blocks.

9. A method according to claim 6, 7 or 8 wherein each block is windowed using a raised-cosine or other windowing aperture.

10. A method according to claims 6, 7 or 8, wherein each block is windowed and each windowed block is surrounded with zeroes.

11. A method according to claim 6, 7 or 8, wherein the blocks are overlapping blocks.

12. A method according to claim 1, wherein each elementary area consists of one pixel.

13. A method according to claim 1, wherein each elementary area is a block of pixels.

14. A method according to claim 1, wherein the correlation is phase correlation.

15. A method according to claim 14, wherein a phase correlation function is derived from an inverse Fourier transformer of the product of Fourier transforms of the two pictures.

16. A method according to claim 1, wherein the correlation function is subjected to temporal filtering before the peak correlation values are determined, so as to reduce noise peaks.

17. A method according to claim 16, wherein the temporal filtering is temporarily inhibited whenever there is a shot change.

18. A method according to claim 1, wherein an error surface is derived in the second step for each motion vector and, for each pixel, the motion vector whose error surface exhibits the smallest value is assigned to that pixel.

19. A method according to claim 18, wherein no motion vector is assigned when the smallest value exceeds a predetermined threshold value.

20. A method according to claim 18, wherein each error surface is subjected to spatial filtering to reduce the effect of noise.

21. A method according to claim 18, wherein the error surfaces are multiplied by factors which increase with the vector lengths pertaining to the surfaces.

22. A method according to claim 1, comprising the further steps of effecting temporal interpolation of the pictures utilizing the motion vectors to interpolate the positions of moving objects in accordance with the time point of the interpolated picture between the preceding and succeeding pictures from which it is received.

23. A method according to claim 22, wherein the picture information for uncovered background, with motion vectors pointing away therefrom, is taken into the interpolated picture from the succeeding picture and the picture information for obscured backgruond, with motion vectors pointing there-into, is taken into the interpolated picture from the preceding picture.

24. A method according to claim 22 or 23, wherein a plurality of pictures are interpolated between consecutive input pictures so as to generate a slow motion sequence or increase the field rate for display purposes.

25. A method according to claim 1, wherein the pictures are subjected to temporal filtering to reduce noise and the filtering is extended to include the moving objects shifted from field to field in accordance with their assigned motion vectors.

26. A method according to claim 1, wherein the pictures are transmitted or recorded with bandwidth reduction, with the inclusion of motion vector information for reconstruction of missing samples of moving objects.

27. A method according to claim 1, wherein black and white pictures are coloured by automatically repeating assigned colours from frame to frame at locations determined by motion vectors.

* * * * *